(12) United States Patent
Kron

(10) Patent No.: US 11,572,154 B2
(45) Date of Patent: Feb. 7, 2023

(54) METHOD FOR MANUFACTURING A PROPELLER BLADE AND A PROPELLER BLADE

(71) Applicant: KONGSBERG MARITIME SWEDEN AB, Kristinehamn (SE)

(72) Inventor: Patrik Kron, Kristinehamn (SE)

(73) Assignee: KONGSBERG MARITIME SWEDEN AB, Kristinehamn (SE)

( * ) Notice: Subject to any disclaimer, the term of this patent is extended or adjusted under 35 U.S.C. 154(b) by 82 days.

(21) Appl. No.: 16/980,317

(22) PCT Filed: Mar. 13, 2019

(86) PCT No.: PCT/EP2019/056243
§ 371 (c)(1),
(2) Date: Sep. 11, 2020

(87) PCT Pub. No.: WO2019/175213
PCT Pub. Date: Sep. 19, 2019

(65) Prior Publication Data
US 2021/0031901 A1 Feb. 4, 2021

(30) Foreign Application Priority Data

Mar. 13, 2018 (SE) .................................... 1800058-8

(51) Int. Cl.
*B23K 26/342* (2014.01)
*B64C 11/26* (2006.01)
(Continued)

(52) U.S. Cl.
CPC .............. *B64C 11/26* (2013.01); *B23P 15/00* (2013.01); *B23P 15/04* (2013.01); *F01D 5/141* (2013.01);
(Continued)

(58) Field of Classification Search
CPC .......... B64C 11/26; B23P 15/04; F01D 5/141; F01D 5/18; F01D 5/286; F01D 5/14;
(Continued)

(56) References Cited

U.S. PATENT DOCUMENTS

| 1,540,108 A * | 6/1925 | Degen .................... B64C 11/24 415/914 |
| 2007/0283786 A1 | 12/2007 | Kappmeyer |

(Continued)

OTHER PUBLICATIONS

International Search Report and Written Opinion issued in corresponding International Application No. PCT/EP2019/056243 dated Jul. 17, 2019.
(Continued)

*Primary Examiner* — Jun S Yoo
(74) *Attorney, Agent, or Firm* — Foley & Lardner LLP

(57) ABSTRACT

The present invention involves a method for manufacturing a blade (1) for a propeller, which blade (1) has a leading edge (2) and a trailing edge, the method comprising the steps of: forming a conduit in the blade (1), making a plurality of holes (7) through which the conduit (6) communicates with the exterior of the blade (1), and providing a blade blank having an edge part receiving surface (4) extending along at least a major part of the leading edge (2) of the blade (1) to be manufactured, wherein forming a conduit (6) comprises building up an edge part (3) onto the edge part receiving surface (4) by a wire-based additive manufacturing process, wherein the additive manufacturing process is adapted to form the conduit (6) at least partly delimited by the edge part (3) and extending along the leading edge (2) of the blade (1) to be manufactured.

10 Claims, 3 Drawing Sheets

(51) Int. Cl.
  *F01D 5/14* (2006.01)
  *F01D 5/18* (2006.01)
  *B23P 15/00* (2006.01)
  *B23P 15/04* (2006.01)
  *B33Y 10/00* (2015.01)
  *B33Y 80/00* (2015.01)

(52) U.S. Cl.
  CPC ............... *F01D 5/18* (2013.01); *B33Y 10/00* (2014.12); *B33Y 80/00* (2014.12); *F05D 2230/31* (2013.01); *F05D 2240/303* (2013.01)

(58) Field of Classification Search
  CPC . F01D 5/28; F01D 5/181; F01D 5/182; B33Y 10/00; B33Y 80/00; F05D 2230/31; F05D 2240/303; F05D 2230/30; B63H 1/18; B63H 1/26; B23K 2101/001; B23K 26/34; B25K 26/342
  See application file for complete search history.

(56) References Cited

U.S. PATENT DOCUMENTS

| | | |
|---|---|---|
| 2014/0126995 A1 | 5/2014 | Schick et al. |
| 2018/0171802 A1* | 6/2018 | Lacy .................. F01D 5/147 |
| 2019/0039134 A1* | 2/2019 | Vogel .................. B22F 3/1028 |

OTHER PUBLICATIONS

International Preliminary Report on Patentability issued in corresponding International Application No. PCT/EP2019/056243 dated Jul. 20, 2020.

\* cited by examiner

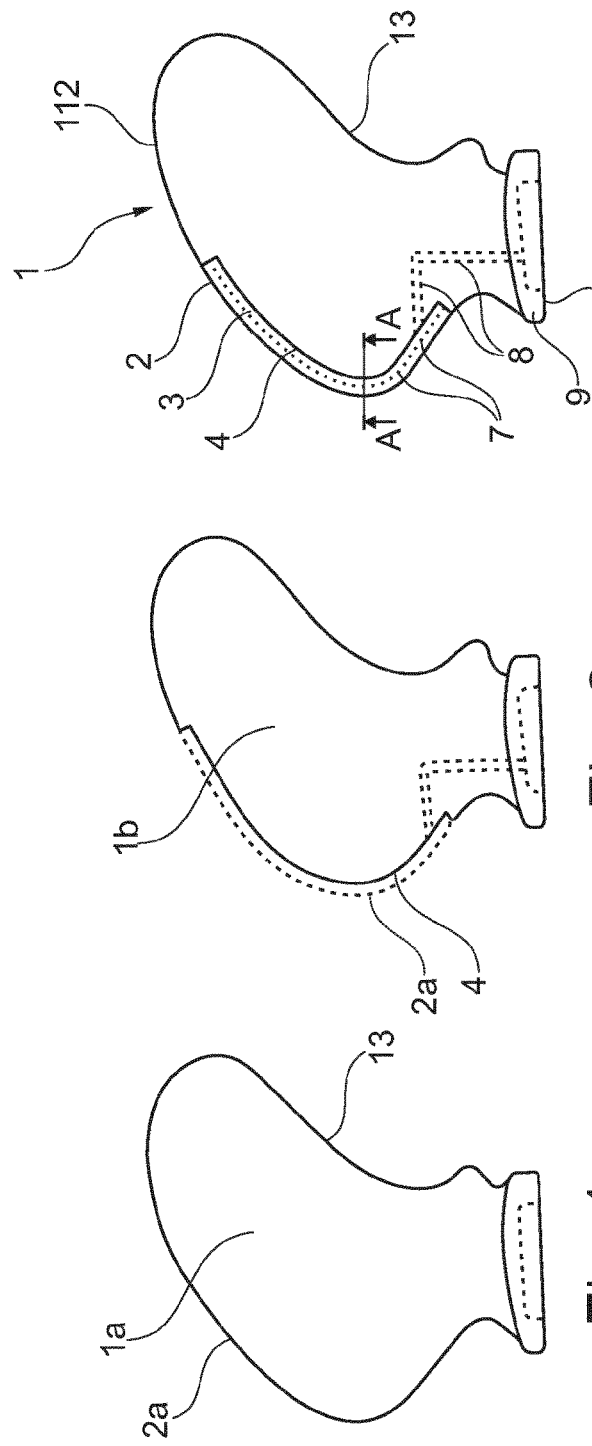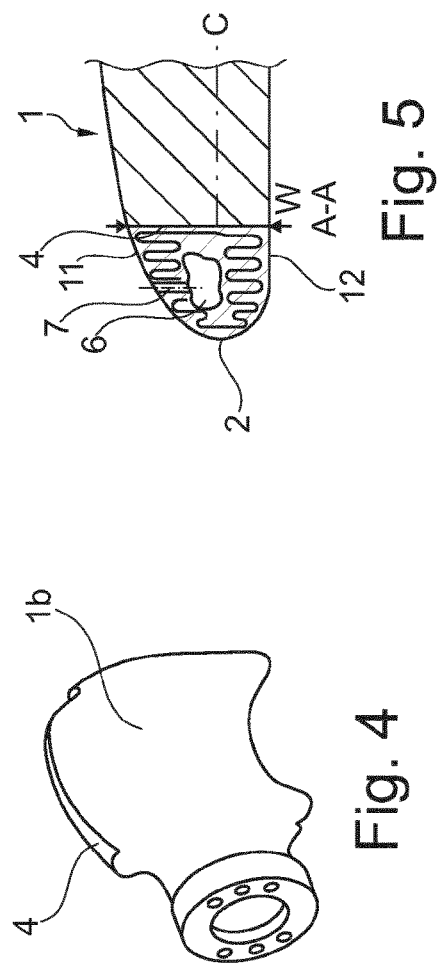

METHOD FOR MANUFACTURING A PROPELLER BLADE AND A PROPELLER BLADE

CROSS-REFERENCE TO RELATED APPLICATIONS

This application claims priority to PCT/EP2019/056243, filed Mar. 13, 2019, entitled "A METHOD FOR MANUFACTURING A PROPELLER BLADE AND A PROPELLER BLADE," which claims priority to Swedish Patent Application No. 1800058-8, filed Mar. 13, 2018, all of which are incorporated by reference in their entirety.

FIELD OF INVENTION

The present invention relates to a method for manufacturing a blade for a propeller. The invention also relates to a blade for a propeller.

BACKGROUND OF INVENTION

Propeller blades can suffer from the problem of cavitation adjacent the leading edge of the blade. The cavitation normally takes place on the suction side or in the tip region of the blade. Cavitation will create a significantly increased noise spectrum, and a cavitation collapse process may cause severe damage to the blade and even destroy it. Many attempts have been made to cope with the cavitation problem. A used technique is to blow pressurized air to the region where cavitation is to be expected. According to a traditional technique this is achieved by providing a conduit within the blade, adjacent its leading edge. The conduit is, by a plurality of holes, connected to the suction, or to both sides of the blade, adjacent the leading edge. The conduit is, by means of a supply duct through the propeller blade, connected to a source of pressurized air. By blowing air, via the supply duct, the conduit, and the holes, the cavitation collapse process is suppressed such that cavitation erosion is eliminated or at least reduced. The noise spectrum of the propeller blade is also effected by the air blowing.

Manufacturing the conduit is complicated due to the normally complex shape of the leading edge of a blade. A known technique is to make a groove in the suction side of the blade, along the leading edge. Thereafter the groove is closed by welding a cover at the top of it. This is followed by machining the cover and the surrounding area of the suction side, in order to obtain a smooth surface. This procedure, however, leads to a risk of cracks in the region of the cover, in particular at the side thereof facing the leading edge. These and other similar solutions thus also face disadvantages, and are also relatively costly.

It is therefore a need to provide alternatives for obtaining the duct system, necessary for distributing pressurized air to the regions where cavitation may occur.

SUMMARY OF INVENTION

The object of the present invention is to meet the mentioned need and thus find a solution that is more reliable and cost-effective than known techniques.

The object is reached by a method according to claim 1. Thus, the invention provides a method for manufacturing a blade for a propeller, which blade has a leading edge and a trailing edge, the method comprising forming a conduit in the blade, making a plurality of holes through which the conduit communicates with the exterior of the blade, and providing a blade blank having an edge part receiving surface extending along at least a major part of the leading edge of the blade to be manufactured, wherein forming a conduit comprises building up an edge part onto the edge part receiving surface by a wire-based additive manufacturing process, wherein the additive manufacturing process is adapted to form the conduit at least partly delimited by the edge part and extending along the leading edge of the blade to be manufactured.

The additive manufacturing process may be programmed to form the conduit located within the edge part. The additive manufacturing process may be a suitable electron-beam additive manufacturing process, for example metal wire-based additive manufacturing, e.g. WAAM (Wire and Arc Additive Manufacturing). WAAM is a relatively new technique and has to a large extent been developed in connection with the 3D-printing technique. It has been suggested also within the field of propeller manufacturing, mainly for the purpose of weight reduction. A WAAM set-up may consist of a conventional welding set-up, with a heat source, a wire feeder, and a robotic arm to guide the material deposition layer by layer. The material is deposited only at desired locations according to a computer program controlling the robot arm. The heat source may be an electric arc, the raw material may be a welding filler wire, and the robotic arm may control and guide the deposition process. During WAAM, a single layer of metal may be deposited on a previous layer.

Although relatively new, the WAAM technology is known to skilled person. For further information reference is made to "Wire Arc Additive Manufacturing of Manganese Aluminium Bronze", by Milan Agnani, describing various aspects of the WAAM technique in connection with propeller blade technology; (https://repository.tudelft.nl/islandora/object/uuid%3Af4a1bce3-fa67-4a04-8500-ead3391dacaa), and "Mechanical and corrosion behaviour of 3D printed Aluminium Bronzes Produced by Wire+Arc Additive Manufacturing", in particular pages 13-18, by Stamatis Kiakidis; (https://repository.tudelft.nl/islandora/object/uuid%3A6394e228-595a-4b1b-bbeb-ae0e98b86f97?collection=education), which are hereby incorporated in the present application by reference.

The leading edge and a trailing edge of the blade may be, as is known per se in propeller theory, connected by a pressure side and a suction side. As well known in propeller theory, the leading edge is the edge of the blade which is most upstream in the surrounding fluid. As is also known, the blade may be designed from aerofoils extending in parallel with the fluid movement, and which extend from the leading edge to the trailing edge of the blade. A line extending from the leading edge to the trailing edge is known as the chord line. The chord line may be straight.

By applying the WAAM technique for forming the edge part of the blade, the conduit for the air distribution will be formed in a simple and cost-effective manner. A further important advantage is that the blade will be strong and secure in the region adjacent the leading edge, in spite of the presence of the air duct system in this region. The risk for cracks at the leading edge is thereby eliminated or at least drastically reduced.

Preferably, the wire-based additive manufacturing process is a metal wire-based additive manufacturing process.

The conduit may be completely enclosed by the edge part. The conduit may be delimited by the edge part. Preferably, the additive manufacturing process is adapted to form the conduit delimited by the edge part, wherein the conduit is completely enclosed by the edge part. By forming the conduit by building up an edge part onto the edge part receiving surface by a wire-based additive manufacturing process, the conduit may be completely enclosed by the edge part. Thus, the additive manufacturing process may be adapted to form the conduit so as to be located within the edge part. Thereby, the risk of cracks at the conduit is considerably reduced. In particular, by the wire-based additive manufacturing process, it is possible to remove the conduit from the blade blank. Thereby, the joining surface between the edge part and the blade blank may be significantly increased, whereby stresses between the two parts may be reduced. In addition, it is possible to form the conduit without any sharp corners, e.g. with a circular, or elliptical cross-section, which further reduces the risk of cracks.

However, in some embodiments, the edge part receiving surface may form a partial delimitation of the conduit. Thereby, the conduit may be partly delimited by the edge part.

According to a preferred embodiment, in a cross-section coinciding with an aerofoil of the blade, the edge part receiving surface is substantially perpendicular to the chord line of the aerofoil. This will simplify the attachment of the edge part, built up by the WAAM process, to the blade blank, and results in a strong bond between the edge part and the blade blank.

According to a further preferred embodiment, the amount of material applied to the edge part by the additive manufacturing process is such that it results in that the distance from the edge receiving surface to the leading edge, of the blade to be manufactured, generally corresponds to the width of the edge part receiving surface between a pressure side and a suction side, connecting the leading and trailing edges. The expression "generally corresponds" is preferably understood as the distance from the edge receiving surface to the leading edge being less than twice and more than half said width of the edge part. This provides beneficial dimensions of the edge part manufactured according to the wire-based additive manufacturing process, and means that in a cross section of the blade, the edge part will have about the same dimensions in two perpendicular directions. The height of the edge part, i.e. the distance from the edge receiving surface of the blank to the leading edge, will be sufficiently large for housing the conduit for the air. The specified relative dimensions also limit the height of the edge part to a size that is not unnecessary large.

According to a further preferred embodiment, the applying of the edge part is programmed such that the conduit occupies 2-20% of the volume of the edge part. The conduit should be wide enough for allowing sufficient amounts of air to flow therethrough to the holes, through which it is blown out. On the other hand, the width of the conduit should be limited in order to maintain the strength of the edge part. The specified range represents a beneficial adaption to these demands.

According to a further preferred embodiment, the holes are made such that each hole extends solely through the edge part. Thereby the holes will mouth close to the leading edge, i.e. in a region where cavitation problems may appear. It is also an advantage to avoid that the holes extend through two different parts, which are possibly of different structure and material. Preferably the holes are obtained by drilling.

According to a further preferred embodiment, the provided blade blank is obtained by providing a preliminary blank, having a shape substantially corresponding to the blade to be manufactured, and machining a portion of the preliminary blank, along at least a major part of the leading edge of the preliminary blank, so that the leading edge is cut away along said major part, thereby forming said edge part receiving surface.

Through this two-step manufacturing of the blade blank the edge part receiving surface may be very precisely shaped and cost-effectively obtained.

Preferably, the conduit is narrowed towards a tip of the blade. The blade may present a root and a tip. Thereby, the cross-sectional area of the conduit may be reduced in a direction from the root towards the tip. The conduit may be gradually narrowed towards a tip of the blade. Thus, the cross-sectional area of the conduit may be gradually reduced in a direction from the root towards the tip. Alternatively, the entire conduit may present a constant cross-sectional area. In some embodiments, the conduit may present one or more sections with a constant cross-sectional area. Thereby, adjacent constant cross-section conduit sections may be connected with a conduit section with a cross-sectional area that is gradually reduced in a direction from the root towards the tip.

The object of the invention is also achieved in that a blade for a propeller includes the features of claim 10. The blade thus presents a leading edge, and an internal conduit, which conduit communicates by a plurality of holes with the exterior of the blade. The blade comprises a main body and an edge part, which edge part is built up onto the main body by a wire-based additive manufacturing process. The edge part at least partly delimits the conduit extending at least along a major part of the leading edge. The wire-based additive manufacturing process may be a metal wire-based additive manufacturing process.

The edge part may have the internal conduit. The internal conduit may be within the edge part. The conduit is preferably completely enclosed by the edge part. However, in some embodiments, the main body may, together with the edge part, delimit the internal conduit.

According to a preferred embodiment of the invented blade, the distance from the main body to the leading edge generally corresponds to the thickness of the blade where the edge part meets, e.g. is attached to, the main body. "Generally corresponds" is to be understood as less than twice and more than half that thickness.

According to a further preferred embodiment, the conduit occupies 2-20% of the volume of the edge part.

According to a further preferred embodiment, each hole extends solely through the edge part.

Preferably, the conduit is gradually narrowed towards a tip of the blade.

The invention also relates to a propeller provided with a plurality of blades according to the present invention, in particular according to any of the preferred embodiments thereof, and/or being provided with a plurality of blades manufactured according to the present invention, in particular according to any of the preferred embodiments thereof.

The invented blade, the invented propeller and the preferred embodiment of these have advantages similar to those of the invented method and the preferred embodiments thereof, which advantages have been described above. Preferably the blade is manufactured according to the method of the present invention, in particular according to any of the preferred embodiments thereof.

The above specified preferred embodiments are set out in the dependent claims. It is to be understood that further embodiments may be constituted by any possible combination of features in the dependent claims and any possible combination of these features with features described in the following description of examples of the invention.

BRIEF DESCRIPTION OF THE DRAWINGS

FIG. 1 is a side view of a preliminary blade blank, and illustrates a first step of an example of a method according to the invention for manufacturing a blade for a propeller.

FIG. 2 is a side view of a blade blank, and illustrates a second stage of the exemplifying way of carrying out the method.

FIG. 3 is a perspective view of the blade blank depicted in FIG. 2.

FIG. 4 in a side view illustrates the blade manufactured according to the example.

FIG. 5 is a section along line A-A of FIG. 3.

DESCRIPTION OF EXAMPLES

Figure 6:
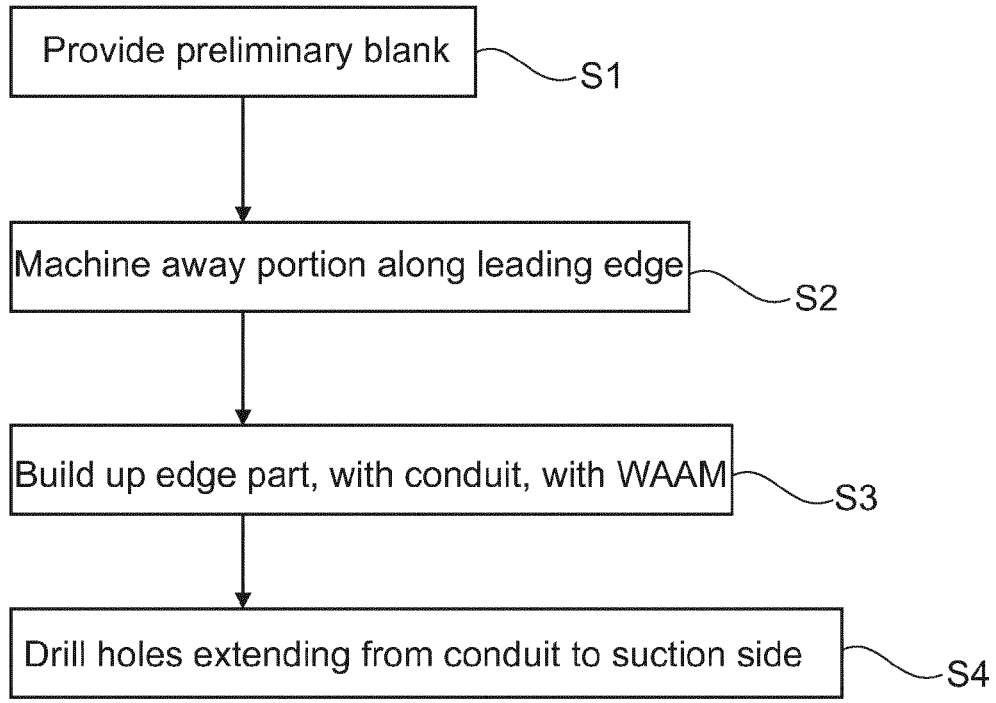
FIG. 6 is a block diagram depicting steps in the method described with reference to FIG. 1-5.

FIG. 1 in a side view illustrates a preliminary blank 1a for manufacturing a propeller blade according to an example of a way to carry out the invention. The preliminary blank 1a has a shape that substantially corresponds to the manufactured blade 1 (see FIG. 4). The preliminary blank 1a thus has a leading edge 2a substantially corresponding to the leading edge 2 of the manufactured blade 1. The preliminary blank also presents a trailing edge 13. It is understood that, as is known per se, the propeller blade presents the shapes of aerofoils extending along the intended fluid movement directions across the blade. As is known per se, the aerofoils present respective chord lines, (see FIG. 5, "C"), between the leading and trailing edges 2a, 13. On one side of the blade, a pressure side extends from the leading edge to the trailing edge, and on the other side of the blade, a suction side extends from the leading edge to the trailing edge.

The preliminary blank 1a may be produced by any convenient method, e.g. by casting. The material used for the preliminary blank 1a may be for example an aluminium bronze, commonly referred to as 'propeller bronze', a stainless steel material, or aluminium. A stainless steel material is commonly used for propellers operation in ice conditions. Aluminium is commonly used for smaller propellers.

In the next step illustrated in FIGS. 2 and 3, a portion along the leading edge 2a of the preliminary blank 1a is machined away, creating a blade blank 1b with an edge receiving surface 4. Thus all material between the dotted line 2a and the edge part receiving surface 4 is cut away. As a result, a recess, with the edge receiving surface 4, is formed. The blade blank 1b forms a main body 1b of the finished blade.

The edge receiving surface may be convex, or concave, or it may present a cross-section that is substantially straight. The edge receiving surface may be substantially perpendicular to the extension of the chord lines of the blade aerofoils at the edge receiving surface. The "depth" of the portion along the leading edge, which is removed, may be e.g. 2-15% of the length chord lines, preferably 5-12%, e.g. around 7.5%, of the length chord lines. Thus, the portion along the leading edge, which is removed, may extend along the chord lines, e.g. 2-15% of the length chord lines, preferably 5-12%, e.g. around 7.5%, of the length chord lines.

Thereafter an edge part 3 is built up onto the edge part receiving surface 4. This is made with a metal wire-based additive manufacturing process, in this example a Wire and Arc Additive Manufacturing (WAAM) process. The process may be carried out by a machine or robot, (not shown), which is programmable to move one or more tools therein, e.g. a welding torch and a wire feed device, in order to add material to build up the edge part with the desired shape.

The material used for the additive manufacturing process may be for example an aluminium bronze, a stainless steel material, or aluminium.

The process is programmed to fill up the recess formed in the step described above, of machining away a portion along the leading edge 2a, such that a leading edge 2 is formed. Thereby material is added onto the edge receiving surface 4 to form a region along the leading edge of the blade.

The WAAM process is further programmed and controlled to form a conduit 6 (see FIG. 5) within the edge part 3. The conduit 6 runs along the contour of the leading edge 2 along substantially its entire extension, or at least a major portion thereof.

A plurality of holes 7 are bored from the suction side 11 of the blade 1 into the conduit 6. As can be seen in FIG. 3, the blade presents an air duct 8 having a radial and an axial branch. This air duct 3 may be manufactured by drilling. By means of the air duct 8, the conduit 6 may communicate with the hub of the propeller (not shown), of which the blade 1 will form a part.

In use, pressurized air from an air source in the hub or connected thereto may flow through the air duct and via the conduit 6 and holes 7 to the suction side 11 to suppress the appearance of cavitation.

It should be noted that in some embodiments, a plurality of holes 7 may be bored from the suction side 11, as well as from the pressure side 12, i.e. from both sides of the blade 1, into the conduit 6. In such embodiments, pressurized air from an air source in the hub or connected thereto may, in use, flow through the air duct and via the conduit 6 and holes 7 to the suction side 11, as well as to the pressure side 12, to suppress the appearance of cavitation.

Thus, a blade as depicted in FIG. 3 is provided. The blade presents a root 111 and a tip 112. Preferably, the conduit 6 (FIG. 5) is gradually narrowed towards the tip 112. I.e., the cross-sectional area of the conduit is gradually reduced in a direction from the root 111 towards the tip 112.

It is to be understood that the shape of the preliminary blank 1a, defined as substantially corresponding to the manufactured blade, may be such that its region around the leading edge 2a does not present precisely the same shape as the region around the leading edge 2 of the finished blade 1. This may be because it is anyhow to be cut away. As a matter fact the leading edge of the preliminary blank may preferably be somewhat recessed such that less material has to be cut away for forming the edge receiving surface 4.

It is also to be understood that the blade blank 1b is not necessarily attained via a preliminary blank 1a as shown in FIG. 1. The blade blank 1b may for example be casted directly with the edge receiving surface 4, i.e. so as to have the shape illustrated in FIG. 2.

Thus, with reference to FIG. 6, the exemplary method described with reference to FIG. 1-5 can be summarized as follows: Provide a preliminary blank, S1. Machine away a portion along the leading edge of the preliminary blank, S2. Build up the edge part, with the conduit, with WAAM, S3. Drill holes extending from conduit to the suction side S4, or, in some embodiments, to both sides 11, 12.

Figure 6A:
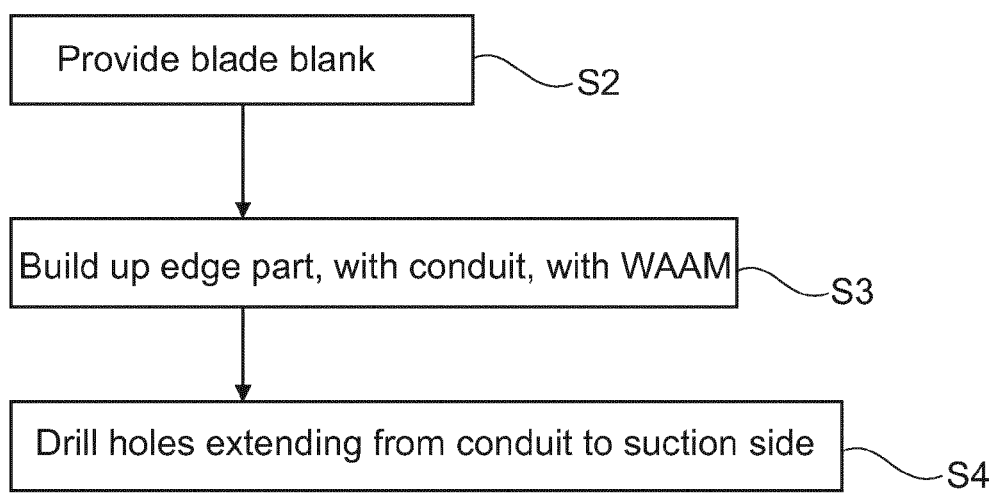
FIG. 6a is a block diagram depicting steps in a method according to an alternative embodiment of the invention.

As understood from FIG. 6a, in embodiments where the blade blank 1b is casted directly with the edge receiving surface 4, providing S2 the blade blank may be succeeded by step S3, where the edge part, with the conduit, is build up with WAAM.

Figure 7:
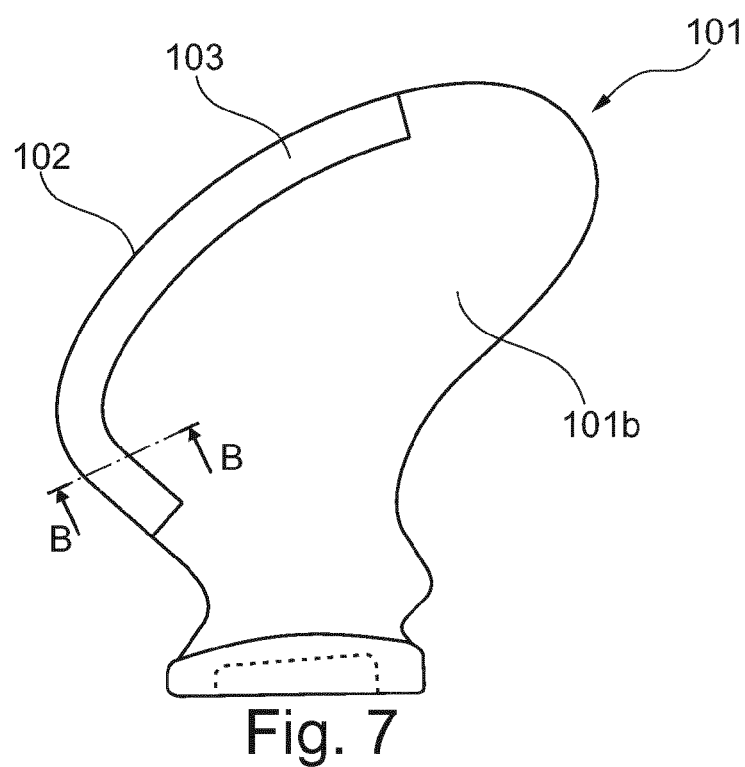
FIG. 7-9 illustrate a further alternative for carrying out the invention.

FIG. 7 in a side view illustrates a blade 101 according to another example of the invention. The blade consists of a first part 101b and a second part 103. The first part 101b may be manufactured according to any traditional technique, such as casting. The second part 103 has been built up onto the first part 101a by a WAAM process. In this example the second part 103 forms the leading edge 102 of the blade 101.

Figure 8:
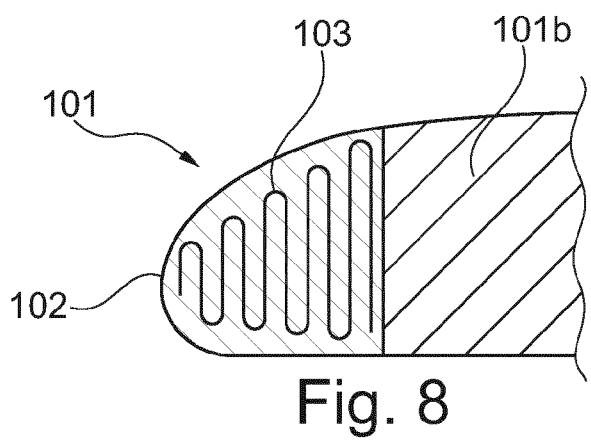
Figure 9:
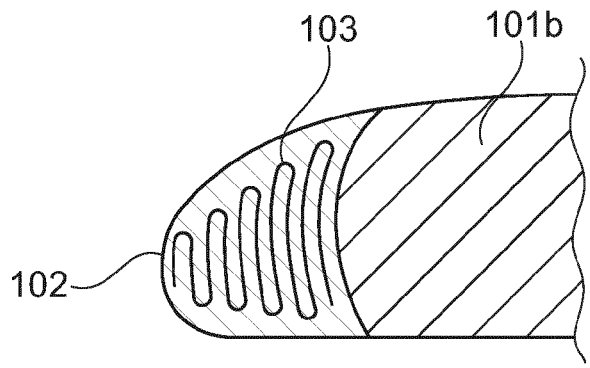

FIG. 8 is a section along line B-B of FIG. 7 according to a first example, and FIG. 9 is a section along the same line according to an alternative example.

The first part is made in traditional material used for propeller manufacturing. The second part produced by the WAAM process is in a material that has, compared to the material of the first part, a greater resistance to impact damage and/or erosion. In some embodiments, a bronze blade leading edge can be coated by stainless steel material added by WAAM for increased strength and wear resistance. This is beneficial since the second part in these examples is located were the blade is particularly exposed to wear. Other locations of the second part may also be appropriate in case the working conditions are such that excessive wear can be expected somewhere at such another location. In a still further alternative more than one WAAP manufactured part may be built up onto the first part. Furthermore, a conduit, similar to that shown in FIG. 5 may be provided in the second part 103.

Aspects of the invention may be represented by one or more of the following clauses:

1. A method for manufacturing a blade 1 for a propeller, which blade 1 has a leading edge 2 and a trailing edge 13, comprising
   providing a blade blank 1b having an edge part receiving surface 4 extending along at least a major part of the leading edge 2 of the blade 1 to be manufactured,
   building up an edge part 3 onto the edge part receiving surface 4 by a wire-based additive manufacturing process, wherein the additive manufacturing process is adapted to form a conduit 6 at least partly delimited by the edge part 3 and extending along the leading edge 2 of the blade 1 to be manufactured, and
   making a plurality of holes 7 through which the conduit 6 communicates with the exterior of the blade 1.

2. A method according to clause 1, wherein, in a cross-section coinciding with an aerofoil of the blade, the edge part receiving surface 4 is substantially perpendicular to the chord line C of the aerofoil.

3. A method according to any one of clauses 1-2, wherein the amount of material applied to the edge part 3 by the additive manufacturing process is such that it results in that the distance from the edge receiving surface 4 to the leading edge 2, of the blade 1 to be manufactured, generally corresponds to the width W of the edge part receiving surface 4 between a pressure side 12 and a suction side 11, connecting the leading and trailing edges 2, 13.

4. A method according to any one of clauses 1-3, wherein the edge part 3 is built up by the additive manufacturing process such that the conduit occupies 2-20% of the volume of the edge part 3.

5. A method according to any one of clauses 1-4, wherein the holes are made such that each hole 7 extends solely through the edge part 3.

6. A method according to any one of clauses 1-5, whereby the provided blade blank 1b is obtained by
   providing a preliminary blank 1a, having a shape substantially corresponding to the blade 1 to be manufactured,
   machining a portion of the preliminary blank 1a, along at least a major part of the leading edge 2a of the preliminary blank 1a, so that the leading edge is cut away along said major part, thereby forming said edge part receiving surface 4.

7. A method for forming a blade for a propeller, comprising
   providing a blade blank representing a first part 101b of the blade 101 to be manufactured, and
   building up at least one second part 103 onto the first part 101b by a wire-based additive manufacturing process to form the complete blade 101.

8. A method according to clause 7, wherein the second part 103 is built up along a major part of the leading edge 102 of the blade to be manufactured.

9. A method according to clause 8, including the steps according to any one of clauses 1-6.

10. A method according to any one of clauses 7-9, wherein the second part, produced by the additive manufacturing process, is in a material that has, compared to the material of the first part, a greater resistance to impact damage and/or erosion.

11. A blade 1 for a propeller having a leading edge 2, wherein the blade 1 comprises a main body 1b and an edge part 3, which edge part is built up onto the main body 1b by a wire-based additive manufacturing process, and which edge part 3 at least partly delimits an internal conduit 6 extending at least along a major part of the leading edge 2, which conduit 6 communicates by a plurality of holes 7 with the exterior of the blade 1.

12. A blade according to clause 11, wherein the distance from the main body 1a to the leading edge 2 generally corresponds to the thickness W of the blade where the edge part 3 meets the main body 1b.

13. A blade according to any one of clauses 11-12, wherein the conduit 6 occupies 2-20% of the volume of the edge part 3

14. A blade according to any one of clauses 11-13, wherein each hole 7 extends solely through the edge part 3.

15. A blade 101 for a propeller, which blade 101 has a leading edge 102, wherein the blade 101 comprises a first part 101b and at least one second part 103 attached to the first part 101b, which at least one second part 103 is manufactured by a wire-based additive manufacturing process, which second part 103 preferably includes at least a major part of the leading edge 102.

16. A blade according to clause 15 and including the features of any one of clauses 11-14.

17. A propeller provided with blades 1 according to any one of clauses 11-16, and/or with blades 1 manufactured according to any one of clauses 1-10.

Regarding clause 7, it should be noted that the method thereof provides for a large part of the blade being made in a traditional material and by traditional manufacturing technique. Some regions of a blade may require higher strength and wear resistance. According to this method these parts can be made by the WAAM technique with materials meeting these higher demands. The main part of the blade thereby can be manufactured in a material, and in a way that is less strict with regards to such demands. The result will be a blade that on one hand is cheaper to manufacture and on the other hand will have superior wear resistance properties than conventional blades.

Regarding the embodiment according to clause 8, it may be noted that, since wear and other challenges to the strength of the blade may be particularly severe close to the leading edge, this embodiment of the method is particularly useful with regards to benefiting from the advantages mentioned above.

The invention claimed is:

1. A method for manufacturing a blade for a propeller, which blade has a leading edge and a trailing edge, which blade comprises a conduit in the blade and a plurality of holes through which the conduit communicates with the exterior of the blade, which conduit is, by a supply duct through the blade, arranged to be connected to a source of pressurized air, for suppressing a cavitation collapse process by blowing air, via the supply duct, the conduit, and the holes, the method comprising:

forming the conduit in the blade, and making the plurality of holes through which the conduit communicates with the exterior of the blade, characterized by providing a blade blank having an edge part receiving surface extending along at least a major part of the leading edge of the blade to be manufactured, wherein providing the blade blank comprises:
casting a preliminary blank, and machining away a portion along the leading edge of the preliminary blank to create the edge part receiving surface, or
casting the blade blank with the edge part receiving surface, wherein forming a conduit comprises building up an edge part onto the edge part receiving surface by a wire-based additive manufacturing process, wherein the additive manufacturing process is adapted to form the conduit at least partly delimited by the edge part and extending along the leading edge of the blade to be manufactured.

2. The method according to claim 1, wherein the wire-based additive manufacturing process is a metal wire-based additive manufacturing process.

3. The method according to claim 1, wherein the additive manufacturing process is adapted to form the conduit delimited by the edge part, wherein the conduit is completely enclosed by the edge part.

4. The method according to claim 1, wherein, in a cross-section coinciding with an aerofoil of the blade, the edge part receiving surface is substantially perpendicular to the chord line of the aerofoil.

5. The method according to claim 1, wherein an amount of material applied to the edge part by the additive manufacturing process is such that it results in that the distance from the edge receiving surface to the leading edge, of the blade to be manufactured, generally corresponds to the width of the edge part receiving surface between a pressure side and a suction side, connecting the leading and trailing edges.

6. The method according to claim 1, wherein the edge part is built up by the additive manufacturing process such that the conduit occupies 2-20% of the volume of the edge part.

7. The method according to claim 1, wherein the holes are made such that each hole extends solely through the edge part.

8. The method according to claim 1, whereby the provided blade blank is obtained by:
providing a preliminary blank, having a shape substantially corresponding to the blade to be manufactured, and
machining a portion of the preliminary blank, along at least a major part of the leading edge of the preliminary blank, so that the leading edge is cut away along said major part, thereby forming said edge part receiving surface.

9. The method according to claim 1, wherein the blade presents a tip, wherein the conduit is narrowed towards the tip.

10. The method according to claim 1, wherein the propeller comprises a plurality of blades.

* * * * *